United States Patent [19]

McKnight

[11] 4,014,419
[45] Mar. 29, 1977

[54] SEQUENTIAL OPERATOR FOR CLUTCH AND BRAKE

[75] Inventor: Jimmy McKnight, Wadley, Ga.

[73] Assignee: Fulghum Industries, Inc., Wadley, Ga.

[22] Filed: Aug. 30, 1973

[21] Appl. No.: 393,225

[52] U.S. Cl. .............................. 192/13 R; 74/478
[51] Int. Cl.² ........................................ B60K 29/00
[58] Field of Search ................ 192/13 R, 4 A, 4 C; 74/478

[56] References Cited

UNITED STATES PATENTS

| | | | |
|---|---|---|---|
| 2,917,143 | 12/1959 | Jenny | 192/13 R |
| 2,990,925 | 7/1961 | Bernotas | 192/4 A |
| 3,124,970 | 3/1964 | Walker | 192/13 R X |
| 3,746,135 | 7/1973 | Ishikawa | 192/4 A |
| 3,815,697 | 6/1974 | Bridwell et al. | 192/13 R |

Primary Examiner—Benjamin W. Wyche
Attorney, Agent, or Firm—Cushman, Darby & Cushman

[57] ABSTRACT

In a wheeled industrial vehicle a single foot pedal operates to disengage an engine from its transmission and to apply the brakes. This function is accomplished by means of a special mechanical linkage including a ratio arm to which a force is applied by the foot pedal, the arm acting first to apply slight braking, second to disengage the engine from the transmission when the brake system begins to generate resistance to further application of braking force and third to apply full braking force when the engine has been disengaged from the transmission.

2 Claims, 2 Drawing Figures

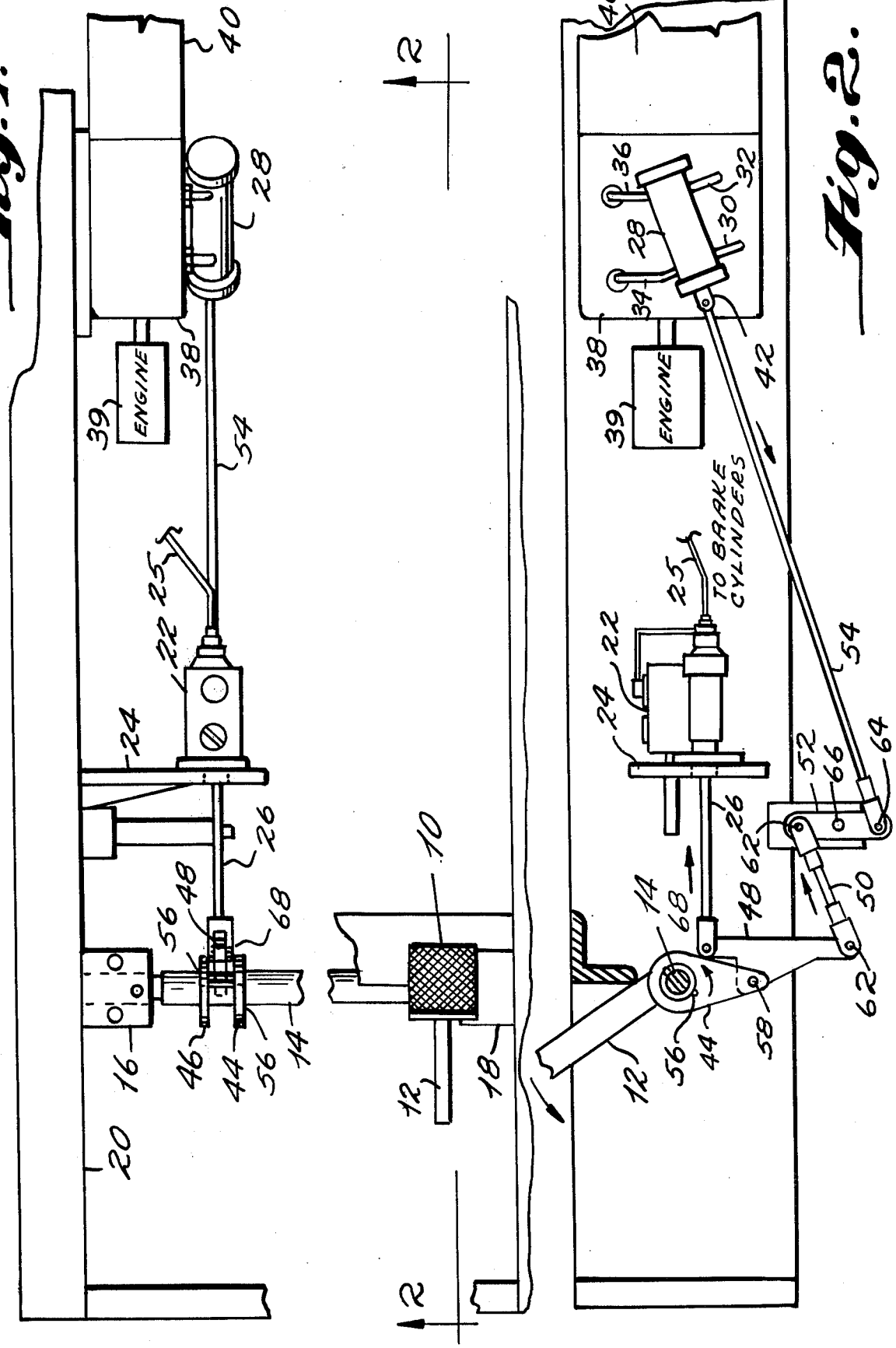

SEQUENTIAL OPERATOR FOR CLUTCH AND BRAKE

This invention relates to wheeled industrial vehicles of the kind having an engine, a transmission, a brake system and a hydraulic control valve, or inching valve, which is operable to neutralize or disengage the transmission upon application of the vehicle brakes. In particular the invention relates to an improved mechanical linkage for operating the control valve and the brake system by means of a single lever, such as a foot pedal.

It is conventional in wheeled industrial vehicles to provide a hydraulic control valve often referred to as an inching valve for the purpose of disengaging or substantially disengaging the engine from the transmission. The inching valve is activated, for example, when it is desired to maneuver the vehicle at low speed while the engine is running at a relatively high speed. Also, when auxiliary equipment such as a lifting mast is being used the vehicle engine speed will be increased to increase the lift speed. If it is desired to bring the vehicle to a stop when lifting is required, the inching valve will be activated; otherwise the operator must take the transmission out of gear prior to speeding up the engine. The inching valve is sometimes controlled by the operator by means of a lever or pedal separate from the pedals for the brake system and for the throttle. Alternatively there may be provided an interconnection between the vehicle brake system and the inching valve which activates the latter upon the application of the brakes.

The present invention is concerned with the latter type of system and has for its principal object the provision of a simple and effective mechanical linkage which upon application of foot pressure on the brake pedal partially activates the brake system, then partially or wholly disengages the drive connection between engine and transmission and then applies further braking. In the embodiment described in detail hereinafter the special linkage includes an arm pivotally connected at a first point to the brake activating system and at a second point to the inching valve actuating system. Intermediate these two pivot points the arm is pivotally connected to a link carried by the brake pedal torque shaft or the equivalent. Rotation of the brake torque shaft upon application of foot pressure to the brake pedal moves the arm in a direction to begin applying the brakes, whereupon the resistance of the brake activating system and continued brake pedal pressure causes the arm to begin swinging about the first pivot connection. The swinging movement gradually activates the inching valve to its fully activated position at which time the fulcrum point shifts to the second pivot connection with the result that further movement of the foot pedal applies full braking.

The invention will be further understood from the following detailed description of the above-summarized exemplary embodiment, together with the drawings in which:

FIG. 1 is a top plan view of a vehicle brake activating system provided with an inching valve control linkage; and FIG. 2 is a sectional view taken generally along the line 2—2 of FIG. 1.

In the two views the illustrated brake system is seen to include a brake foot pedal 10 carried by a lever arm 12 which is transverse to and fixed to a brake torque shaft 14, the latter being rotatably mounted at its ends in bearings 16, 18 fixed to frame members 20 of a vehicle. A master brake cylinder 22 is carried by a support plate 24 which is fixed to one of the frame members 20. A hydraulic line 25 leads from the master brake cylinder 22 to the hydraulic brake cylinders (not shown) of the vehicle for transmitting hydraulic pressure when the cylinder 22 is activated by movement of a push rod 26 to the right as viewed in the drawings. All of the above elements may be of conventional construction and operation and therefore do not require further description.

In FIG. 2 there is illustrated schematically an inching valve 28 which may be of conventional construction, such as a single spool hydraulic control valve having hydraulic supply and exhaust lines 30 and 32 and hydraulic control lines 34 and 36. The control lines 34 and 36 lead to a fluid-pressure-actuated drive coupling 38 between the vehicle engine 39 and a transmission 40. In the illustrated system movement of the spool 42 of the inching valve 28 toward the left as viewed in FIG. 2 disengages the drive coupling by bleeding pressure from a clutch-locking mechanism (not shown) to the exhaust line 32.

Control of the position of the inching valve spool 42 in accordance with the angular position of the brake lever arm 12 is provided by a mechanical linkage which converts rotational movement of the shaft 14 to linear movement of the valve spool 42. The linkage includes a pair of ratio arm supports 44, 46, a ratio arm 48, a shaft 50 pivotally connected at one end to the ratio arm 48 and at its other end to a direction changing arm 52, and a push rod 54 connected between the direction changing arm 52 and the inching valve spool 42. The ratio arm supports 44, 46 are short links fixed to the brake torque shaft 14 as by welds 56 and extending downwardly as seen in FIG. 2. The ratio arm 48 lies between the arm supports 44, 46 and is pivotally connected at a location intermediate its ends to the lower ends of the arms 44, 46 by a pivot pin 58 which is parallel to the torque shaft 14. The shaft 50 is pivotally connected between the lower end of the ratio arm 48 and the upper end of the direction changing arm 52 by pivot pins 60, 62. The lower end of the arm 52 is connected to a pin 64 to the left end of the push rod 54. The arm 52 is mounted for swinging movement about a fixed pin 66.

The ratio arm 48 is also pivotally connected to the left end of the brake cylinder push rod 26 by means of a pin 68. It will be seen that the ratio arm 48 being pivotally connected at 3 points is capable of transmitting a force applied at the intermediate pivot pin 58 to the other pins 62 and 68. If resistance to movement is applied at either pin 62 or 68 the ratio arm tends to rock around that pin and effect a greater force on the other pin.

In operation the parts of the system are in their illustrated positions when no foot pressure is being applied to the foot pedal 10. As the pedal 10 is depressed by the operator of the vehicle the brake lever arm 12 begins to move counterclockwise as viewed in FIG. 2, and this imparts a similar movement to the support arms 44, 46. The ratio arm 48 is thereby moved by the arms 44, 46 slightly to the right thus slightly displacing the master brake cylinder push rod 26 to the right and applying a small amount of pressure to the brake cylinders. These movements of the parts are illustrated by arrows in FIG. 2. When the brake shoes just seat against the brake drums, there is a small resistance to further movement of the push rod 26. At this point the pivot pin 58 becomes a fulcrum point so that the ratio arm 48 begins to swing counterclockwise about the pin 58 thereby shifting the shaft 50 to the right. The action of the direction changing arm 52 converts this movement to leftward movement of the inching valve push rod 54 thereby moving the inching valve spool 42 to the left. As described above, this movement of the spool 42 releases the hydraulic pressure on the clutch 38 and disengages the engine 39 from the transmission 40. When the spool 42 reaches the end of its stroke, no further movement of the push rod 54, arm 52 and shaft 50 can occur. If foot pressure is still being applied to the pedal 10 and hence to the pivot pin 58, the pivot pin 62 then becomes a fulcrum point so that the ratio arm 48 begins to swing clockwise. This applies full brake pressure for stopping the vehicle.

In a typical system the first 1½ inches of movement of the foot pedal 10 moves the inching valve spool 42 through its maximum travel. As indicated above, the initial application of foot pressure to the pedal 10 is insufficient to stop the vehicle but it does initiate movement of the spool 42. The position of the spool 42 is directly proportional to the position of the foot pedal 10 during the 1½ inches of travel of the latter so that all degrees of clutch disengagement are available to the vehicle operator.

It will be understood that the principles of the invention do not require the details of the illustrated embodiment and that modifications of the latter may be made within the scope of the invention.

What is claimed is:

1. A control system for actuating a vehicle brake system and an inching valve assembly for applying a deactuating force to a hydraulically operated clutch disposed between the vehicle engine and the transmission, said control system comprising: a ratio arm having three spaced apart pivot connection points, said arm being supported by three members each of which is pivotally connected to said arm at a different one of said points; operator-actuated means for applying a force to one of said members; means connecting a second of said members to the brake system; means connecting the third member to the inching valve, said pivot connection points being arranged relative to one another such that when the second member meets with resistance to movement the pivot connection between said arm and said second member functions as a fulcrum with the result that continued force applied to said one member is transmitted to said third member.

2. A control system for actuating a vehicle brake system and an inching valve assembly which engages and disengages a driving connection between the vehicle engine and the vehicle transmission, said control system comprising an operator actuated operating element and a mechanical linkage including a ratio arm connected at one point to said operating element so that initial movement of the latter applies a force to said ratio arm; said ratio arm being connected at a second point to said inching valve assembly and connected at a third point to said brake system for applying braking force upon initial movement of said operating element and responsive to the resistance to the application of further braking force to operate said inching valve in a mode to disengage said driving connection and thereafter apply further braking force.

* * * * *